United States Patent Office 3,487,089
Patented Dec. 30, 1969

3,487,089
3-(TRIFLUORO METHYL-PHENYL) PYRROLES
Suminori Umio, Kawanishi, Kazuo Kariyone, Kyoto, and Kunihiko Tanaka, Osaka, Japan, assignors to Fujisawa Pharmaceutical Co., Ltd., Osaka, Japan, a company of Japan
No Drawing. Continuation-in-part of application Ser. No. 624,139, Mar. 20, 1967. This application Jan. 30, 1968, Ser. No. 701,573
Claims priority, application Japan, Oct. 12, 1964, 39/58,242; Oct. 22, 1964, 39/60,200; Dec. 7, 1964, 39/68,740, 40/17,732; Dec. 24, 1964, 39/73,138; Feb. 2, 1965, 40/5,814; Mar. 22, 1965, 40/16,850, 40/16,851; Apr. 8, 1965, 40/20,733; Oct. 24, 1967, 42/68,419
Int. Cl. C07d 27/22
U.S. Cl. 260—313.1                                6 Claims

ABSTRACT OF THE DISCLOSURE 3-(trifluoromethyl phenyl) pyrroles are useful as fungicides for medicinal and agricultural applications and are particularly effective in the treatment of athlete's foot. Efficient methods are also proposed for the production of the derivatives.

CROSS-REFERENCE TO RELATED APPLICATIONS

This application is a continuation-in-part of the co-pending application S.N. 624,139 filed on Mar. 20, 1967, now Patent No. 3,428,648 which is a continuation-in-part of the applications S.N. 489,412, now Patent No. 3,367,-944; S.N. 489,413, now abandoned; S.N. 489,429, now abandoned; and S.N. 489,432, now abandoned, all filed on Sept. 22, 1965.

BACKGROUND OF THE INVENTION

The invention relates generally to phenyl pyrrole derivatives and more particularly to 3-(substituted phenyl) pyrroles in which the substituent is trifluoromethyl. The pyrrole nucleus of the compound may be substituted by different groups.

Arima et al. of Japan disclosed in Agricultural and Biological Chemistry, vol. 28, No. 8, Aug. 19, 1964, pp. 575–578, the fermentation of a culture medium with certain strains of pseudomnas to produce pyrrolnitrin which is also called 3-(2-nitro-3-chlorophenyl)-4-chloropyrrole. The pyrrolnitrin of Arima et al. has a recognized utility for the treatment of athlete's foot and as a fungicide in agriculture.

SUMMARY

The compounds of this invention are substituted pyrroles of the formula:

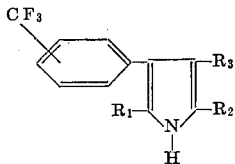

in which $R_1$ is hydrogen, lower alkyl, trihalomethyl, carboxyl, or —$COOR_4$ in which $R_4$ is lower alkyl or aryl lower alkyl; $R_2$ is hydrogen, lower alkyl, trihalomethyl, carboxyl or —$COOR_5$ in which $R_5$ is lower alkyl or aryl lower alkyl; and $R_3$ is hydrogen or halogen.

The compounds of this invention are useful as fungicides and/or as intermediates in the production of 3-(trifluoromethyl phenyl)-4-chloropyrrole which has an extremely high activity against fungi, particularly Trichophyton. The compounds which are useful as fungicides may be employed in agriculture in the form of a spray for the destruction of fungi or in the treatment of mammals for infections by microorganisms, such as Trichophyton asteroides.

A fungicide spray for agricultural uses may be a solution or emulsion of the compounds in a concentration of 0.01–3 parts to about 100 parts of a suitable inert non-toxic solvent or an inert non-toxic carrier and an emulsifier. For use in the treatment of infections of mammals tinctures, ointments or spray solutions can be conveniently employed. For topical application, a concentration of 0.25–3% of the composition is satisfactory.

Each of the compounds of this invention may be produced by one or more of four methods. The methods differ from each other in the reactions which each utilizes. These reactions are:

(1) Decarboxylation with heating;
(2) Halogenation;
(3) Solvolysis; and
(4) Ring-closure.

METHOD OF PREPARATION INVOLVING DECARBOXYLATION WITH HEATING

The compounds of this invention may be produced by a method involving decarboxylation with heating. Such compounds have the Formula II:

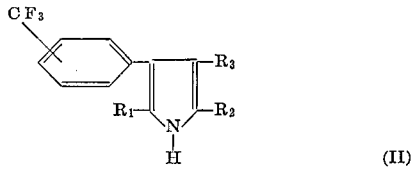

in which $R_1$ is hydrogen, lower alkyl or esterified carboxyl; $R_2$ is hydrogen, lower alkyl or esterified carboxyl; $R_3$ is hydrogen or halogen; provided at least one of $R_1$, $R_2$ and $R_3$ is hydrogen.

The compounds (II) wherein $R_1$ and $R_2$ are hydrogen and $R_3$ is halogen are useful as fungicides in combating infections by microorganisms such as Trichophyton asteroides.

The 3-(substituted phenyl) pyrrole derivatives (II) may be prepared by decarboxylation, with heating, of a compound having the general Formula III:

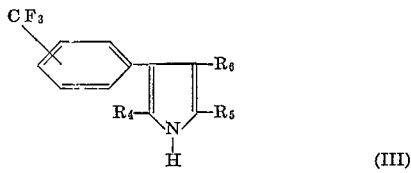

in which $R_4$ and $R_5$ are hydrogen, lower alkyl, carboxyl or esterified carboxyl; and $R_6$ is hydrogen, halogen or carboxyl, provided at least one of $R_4$, $R_5$ and $R_6$ is carboxyl or esterified carboxyl.

In the above Formulas II and III, the esterified carboxyl of $R_1$, $R_2$, $R_4$ and $R_5$ means alkyl or aralkyl ester of carboxylic acid, such as the methyl ester, ethyl ester, propyl ester, isopropyl ester, butyl ester, isobutyl ester, benzyl ester or phenethyl ester.

Examples of halogen in $R_3$ or $R_6$ are chlorine or bromine.

Some examples of the compounds (III) used as starting material are 3-phenylpyrrole-4-carboxylic acids, such as 5 - methyl - 3 - phenylpyrrole-4-carboxylic acid, 2,5-dimethyl - 3 - phenylpyrrole - 4-carboxylic acid or 2-ethoxycarbonyl - 5 - methyl - 3-phenylpyrrole-4-carboxylic acid; 3-phenylpyrrole-2 or 5-carboxylic acids, such as 4-chloro- 3 - phenylpyrrole - 2 or 5 - carboxylic acid, 5 - methyl-3-phenylpyrrole - 2 - carboxylic acid, 4 - chloro-5-methyl-3-phenylpyrrole-2-carboxylic acid or 2-ethoxycarbonyl-4-chloro - 3 - phenylpyrrole - 5-carboxylic acid; 3-phenylpyrrole-2,5-dicarboxylic acids, such as 4-chloro-3-phenyl-pyrrole-2,5-dicarboxylic acid or 4-bromo-3-phenylpyrrole-2,5-dicarboxylic acid in which the phenyl radical is substituted by trifluoromethyl.

These compounds (III) are all new and may be prepared, for instance, as follows:

3-(substituted phenyl) pyrrole-2,5-dicarboxylic acids are obtained by reacting 1 - (substituted phenyl) - 1,3-butanediones with aminomalonic esters in the presence of a condensing agent such as an alkyl polyphosphate, by halogenating the resultant 5-methyl-3-(substituted phenyl) pyrrole-2-carboxylic acid esters, then by solvolysing the resulting 4 - halo - 5 - trihalomethyl-3-(substituted phenyl) prrolye-2-carboxylic acid esters with strong alkali. In this procedure, 5-methyl-3-(substituted phenyl) pyrrole-2-carboxylic acids are easily obtained by hydrolysis of 5-methyl-3-(substituted phenyl) pyrrole-2-carboxylic acid esters and further 4-halo-5-carboxy-3-(substituted phenyl) pyrrole-2-carboxylic acid esters can also be obtained by solvolysis of 4-halo-5-trihalomethyl-3-(substituted phenyl) pyrrole-2-carboxylic acid esters with weak alkali. Furthermore, some 3 - (substituted phenyl) pyrrole-4-carboxylic acids are obtained by condensing 2-aminoalkanolphenones having a substituent in the phenyl ring, with β-ketoacid esters and then hydrolysing the resultant 3-(substituted phenyl)pyrrole-4-carboxylic acid esters.

The decarboxylation step of this invention is carried out under heating in the presence or absence of a base or an inorganic acid, with or without the utilization of a solvent. Among the bases may be mentioned inorganic bases such as sodium hydroxide, potassium hydroxide, sodium carbonate, or potassium carbonate, or organic bases such as dimethylaminoethanol, dimethylaniline, diethylaniline, methylaniline, aniline, dimethylnaphthylamine, α-, β-, or γ-picoline, or quinoline, Liquid organic bases may act as the solvent. Among the inorganic acids are hydrochloric acid or sulfuric acid. A few examples of the solvents are water, lower aliphatic alcohol, or high boiling solvents, such as glycerol, naphthalene or benzoic acid. Furthermore, a catalyst such as copper powder may be used with the organic base.

The reaction is generally carried out by heating at about 130°–270° C. But, the reaction in the presence of an inorganic acid may proceed at a comparatively low temperature of about 60°–130° C. In using hydrochloric acid as an inorganic acid, it is desirable to use a lower aliphatic alcohol as a solvent.

Moreover, the reaction may be carried out either at atmospheric or under increased or reduced pressure. The decarboxylation conditions mentioned above may be divided roughly into the following procedures:

(a) Heating of (III) without adding any reagent;
(b) Heating of (III) in a high boiling solvent;
(c) Heating of (III) in the presence of an organic base;
(d) Heating of (III) in the presence of an inorganic base in water; and
(e) Heating of (III) in the presence of an inorganic acid.

It is desirable to select a suitable condition with due consideration of the kind of group which is capable of splitting off carbon dioxide. The desirable condition for various kinds of (III) becomes apparent in the description in some of the typical examples described herein.

Furthermore, when using 3 - (substituted phenyl) pyrrole-2,5-dicarboxylic acid as a starting material, the decarboxylation occurs firstly in the carboxyl at the 5-position and then at the 2-position, and therefore the 2-carboxylic acid compound as in intermediate may be separated out from the reaction mixture.

METHOD OF PREPARATION INVOLVING HALOGENATION

Certain compounds of this invention may be produced by a method involving halogenation. Such compounds have the Formula IV:

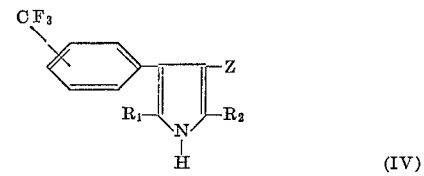

(IV)

in which Z is halogen; and $R_1$ and $R_2$ are methyl, trihalomethyl or COOR' in which R' is lower alkyl or lower aralkyl, provided that when one of $R_1$ and $R_2$ is trihalomethyl, the other is trihalomethyl or COOR'.

In the broader aspects, a compound of the general Formula IV can be prepared according to the present invention by halogenation of a compound of the general Formula V:

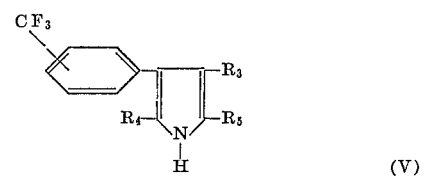

(V)

in which $R_3$ is hydrogen, halogen or the carboxyl group; and $R_4$ and $R_5$ are methyl or COOR wherein R is lower alkyl or aralkyl, provided at least one of $R_4$ and $R_5$ should be methyl when $R_3$ is halogen.

In a compound of the Formula V, halogenation occurs first at the β-position, if there is a replaceable hydrogen or carboxyl group, and then it occurs at the α-methyl group. Accordingly, the halogenation processes disclosed by the present invention involve the following typical reactions:

(A) Nucleic halogenation.—The term "nucleic halogenation" used herein should be understood to mean halogenation at the β-position of the pyrrole nucleus.

(B) Side chain halogenation.—The term, "side chain halogenation," used herein should be understood to cover the complete halogenation (i.e. trihalogenation) of a methyl group which may be present at the α- and/or α'-positions of the pyrrole nucleus.

(C) Exhaustive halogenation.—The term "exhaustive halogenation" used herein should be understood to cover the case where both the nucleic halogenation and side chain halogenation simultaneously occur, or they take successively without appreciable accumulation of any intermediate chlorination product.

Generally speaking, the halogenation process of the present invention can be carried out by using a suitable halogenating agent which is known per se in the art. Typical halogenating agents may include halogens such as chlorine and bromine; halogen halides such as iodine chloride, iodine trichloride and iodine bromide; sulfuryl halides such as sulfuryl chloride; and N-halo-amides or -imides such as N-chlorourea, N-bromo-acetamide, N-bromo-succinimide, N-bromo-phthalimide and the like. A halogenating agent particularly preferable in the intended halogenation reaction can be easily selected by those skilled in the art. Further it should be understood that the amount of a halogenating agent used can be varied depending on the type of the intended halogenation reaction. Usually, the theoretical amount or a slight excess thereof is preferable. The halogenation reaction is conveniently carried out in a solvent medium. Suitable solvents are, for example, ether, chloroform, glacial acetic acid, and the like. Use of a catalyst for the reaction, i.e. iodine, acetyl chloride, cupric chloride, aluminum chloride, and the like, sometimes is advantageous. The reaction can be carried out at room temperature or at elevated temperature. However, too high temperatures are not recommended because of the occurrence of undesired side reactions.

There is now given an explanation with reference to the individual types of the halogenation reactions involved.

(A) Nucleic halogenation

Through this reaction, the replaceable hydrogen or carboxyl group present at the β-position of the pyrrole ring of a phenyl-pyrrole compound can be substituted with halogen. The compounds of the general Formula V wherein $R_3$ is hydrogen or a carboxyl group and/or at least one of $R_4$ and $R_5$ is an esterified carboxyl group are suitable starting materials for this reaction. The hydrogen or carboxyl group present in β-position is more easily replaceable by halogen than a methyl group present in the α- and α'-positions. Esterified carboxyl groups (e.g. alkoxycarbonyl such as methoxycarbonyl or ethoxycarbonyl, benzyloxycarbonyl, phenethyloxycarbonyl, etc.) which may be present at any of the α- and α'-positions are not affected by the action of the halogenating agent. Sulfuryl chloride, chlorine, bromine or N-bromosuccinimide are the preferred halogenating agents for nucleic halogenation because of their availability and convenience in handling.

(B) Side chain halogenation

A methyl group which may be present in α- and/or α'-position of the pyrrole ring in compounds of the general Formula V is subject to halogenation with a halogenating agent to convert it into a trihalomethyl group. Substitution of a replaceable hydrogen or carboxyl group in β-position with halogen (i.e. nucleic halogenation) takes place more readily by the action of a halogenating agent than complete halogenation of α- and/or α'-methyl groups (i.e. side chain halogenation). Accordingly, if a compound of the general Formula V wherein $R_3$ is hydrogen or a carboxyl group, and at least one of $R_4$ and $R_5$ is a methyl group is treated with approximately one mole of a halogenating agent per mole of said compound, the resulting halogenation product will be a compound of the general Formula IV wherein Z is halogen and at least one of $R_1$ and $R_2$ is methyl corresponding to the designation of $R_4$ and $R_5$.

With respect to side chain halogenation in a narrow sense, typical starting materials are compounds of the general Formula V wherein $R_3$ is chlorine or bromine and at least one of $R_4$ and $R_5$ is methyl. However, side chain bromination of a compound of the general Formula V wherein $R_3$ is bromine and at least one of $R_4$ and $R_5$ is methyl is rather difficult. Furthermore, side chain chlorination of said compound occasionally yields a compound of the general Formula IV wherein Z is chlorine and at least one of $R_1$ and $R_2$ is the trichloromethyl group, possibly through a compound of the general Formula IV wherein $R_3$ is chlorine and at least one of $R_4$ and $R_5$ is methyl. Thus careful consideration concerning the type and amount of the halogenating agent and other conditions should be paid if the bromination or chlorination of 4-bromo-3-phenylpyrrole compounds is desired.

(C) Exhaustive halogenation

A compound of the general Formula V where $R_3$ is hydrogen or carboxyl and at least one of $R_4$ and $R_5$ is a methyl group is treated with more than one mole of a halogenating agent to effect both nucleic halogenation and side chain halogenation. The excess of halogenating agent over that required for nucleic halogenation will substitute the replaceable hydrogens of the α- and/or α'-methyl groups. Accordingly, a methyl group attached in α'-position of the pyrrole ring is converted to the trihalomethyl group.

Suitable starting materials include 3-(substituted phenyl) pyrrole-2,5-dicarboxylic acid esters; 3-(substituted phenyl)-5-methyl pyrrole-2-carboxylic acid esters such as ethyl 3-(3-trifluoromethylphenyl)-5-methylpyrrole-2-carboxylate; ethyl 3-(substituted phenyl)-4-chloro-5-methylpyrrole-2-carboxylate, 2,5-dimethyl-3-(substituted phenyl)-4-chloropyrrole, 2,5-dimethyl-3-(substituted phenyl) pyrrole and 2,5-dimethyl-3-(substituted phenyl) pyrrole-4-carboxylic acid. All of these materials are new compounds and they may be prepared from alkyl 3-(substituted phenyl)-5-methylpyrrole-4-carboxylate by the following procedures:

(1) Some of the 3-(substituted phenyl)-4-carboxy-5-methylpyrrole-2-carboxylic acid esters are obtained by subjecting 3-(substituted phenyl)-5-methylpyrrole-4-carboxylic acid ester to the Vilsmeier reaction, reacting the resulting 2-formyl-3-(substituted phenyl)-5-methylpyrrole-4-carboxylic acid ester with hydroxylamine or its salt, heating the resulting 2-hydroxyiminomethylene-3-(substituted phenyl)-5-methylpyrrole-4-carboxylic acid ester, reacting the resulting 2-cyano-3-(substituted phenyl)-5-methylpyrrole-4-carboxylic acid ester with an alcohol in the presence of a mineral acid, and then hydrolyzing the obtained 3-(substituted phenyl)-5-methylpyrrole-2,4-dicarboxylic acid ester.

(2) 3-(substituted phenyl)-5-methylpyrrole-2-carboxylic acid esters are obtained by hydrolyzing 3-(substituted phenyl)-5-methylpyrrole-4-carboxylic acid ester, decarboxylating the resulting 3-(substituted phenyl)-5-methylpyrrole-4-carboxylic acid, reacting the resulting 3-(substituted phenyl)-5-methylpyrrole with carbonyl dihalide and then reacting the obtained 3-(substituted phenyl)5-methylpyrrole-2-carboxylic acid halide with an alcohol. Alternatively they can be obtained by decarboxylation of 3-(substituted phenyl)-4-carboxy-5-methylpyrrole-2-carboxylic acid esters as described in the preceding paragraph (1). 3-(substituted phenyl)-5-methylpyrrole-2-carboxylic acid esters may be converted by this reaction to 3-(substituted phenyl)-4-halo-5-methylpyrrole-2-carboxylic acid esters which also may be used as starting materials of the present invention.

(3) Some of the 2,5-dimethyl-3-(substituted phenyl) pyrrole-4-carboxylic acids are obtained by subjecting 3-(substituted phenyl)-5-methylpyrrole-4-carboxylic acid esters to the Mannich reaction, reacting the resulting 2-dialkylaminomethyl-3-(substituted phenyl)-5-methylpyrrole-4-carboxylic acid esters with alkyl halide, reducing the resulting [4-alkoxy-carbonyl-5-methyl-3-(substituted phenyl)-2-pyrrolyl]-methyltrialkylammonium halide, and then hydrolyzing the obtained 2,5-dimethyl-3-(substituted phenyl)-pyrrole-4-carboxylic acid esters. They can be converted by decarboxylation into the 2,5-dimethyl-3-(substituted phenyl)pyrrole which also can be used as starting material of this invention.

METHOD OF PREPARATION INVOLVING SOLVOLYSIS

Some of the phenyl pyrroles of this invention may be produced by a method involving solvolysis. Such compounds have the following Formula VI:

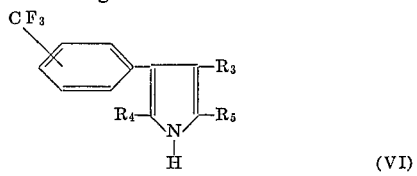

(VI)

in which $R_3$ is hydrogen or halogen; $R_4$ and $R_5$ individually mean hydrogen, lower alkyl or carboxyl, provided that at least one of $R_4$ and $R_5$ is a carboxyl group.

In the broader aspects, a compound of the general Formula VI may be prepared by solvolyzing an appropriate compound of the general Formula VII:

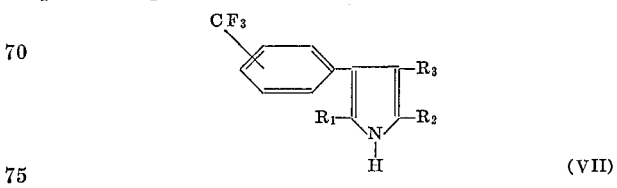

(VII)

in which $R_3$ has the same significance as defined in Formula VI; and one of $R_1$ and $R_2$ is trihalomethyl or esterified carboxyl and the other is hydrogen, lower alkyl, trihalomethyl, carboxyl or esterified carboxyl, provided that when one of $R_1$ and $R_2$ is trihalomethyl, the other should be trihalomethyl or esterified carboxyl.

Trihalomethyl group or groups attached to either one or both of the $\alpha$- and $\alpha'$-positions in the pyrrole ring of a compound of the general Formula VII can be converted to carboxyl by treatment with water, an aliphatic carboxylic acid or an aliphatic alcohol.

Sometimes, the halomethyl group may be converted to an esterified carboxyl group by treatment with an aliphatic alcohol in the presence or absence of an organic base, the resulting esterified carboxyl group in turn being converted to a carboxyl group in the manner specified below.

An esterified carboxyl group or groups attached to either one or both of the $\alpha$- and $\alpha'$-positions of the pyrrole ring of a compound of the general Formula VII can be converted to a free carboxyl group by treatment in an aqueous medium with a strong alkali.

The preferred embodiments of solvolysis according to the present invention are specified hereinbelow.

In the rather generic embodiment of the present invention, a compound of the general Formula VII is reacted with water in the presence or absence of a weak alkali, thereby converting the trihalomethyl group to the carboxyl group while an esterified carboxyl group is kept unchanged, or in the presence of a strong alkali, thereby converting both of the trihalomethyl group and esterified carboxyl group to carboxyl groups. The reaction may be carried out in an aqueous medium, e.g. water or aqueous solution containing an aliphatic alcohol or a lower aliphatic carboxylic acid. Use of water as a solvent, which serves as a reactant at the same time, is preferable. The conversion of the trihalomethyl group to the carboxyl can be achieved by simply boiling a starting material with water, but it is preferable to effect the reaction in the presence of an alkali. Suitable alkalies are strong alkalies such as sodium hydroxide, barium hydroxide, etc., and weak alkalies such as sodium carbonate, sodium bicarbonate, etc. However, if the trihalomethyl group of a compound of the general Formula VII which also contains a hydrolyzable esterified carboxyl group is to be solvolyzed selectively, it is essential to carry out the reaction in the presence of a weak acid or alkali, since the presence of a strong alkali will cause simultaneous hydrolysis of the esterified carboxyl group. In other words, it is necessary to carry out the reaction in the presence of a strong alkali, if both the trihalomethyl group and the esterified carboxyl group of a compound of the general Formula VII are to be convered at the same time to carboxyl groups.

In a specific embodiment where a tertiary butoxycarbonyl group is present at the $\alpha$- or $\alpha'$-position of the pyrrole ring of a compound of the general Formula VII, heating of this compound with a mineral acid or toluene sulfonic acid will suffice to convert said tertiary butoxycarbonyl group to the carboxyl group, with splitting off of butene.

In accordance with the present invention, the mixture of a trihalomethyl compound and a dihalomethyl compound may be subjected to a specific solvolysis procedure so as to convert their trihalomethyl and dihalomethyl groups to carboxyl groups. This procedure is based on the finding that, in a compound of the general Formula VII in which $R_1$ and/or $R_2$ are dihalomethyl group, when it is subjected to oxidative solvolysis by a treatment with an aqueous solution of a strong alkali in combination with an oxidizing agent, the dihalomethyl group is converted to the carboxyl group. An esterified carboxyl group if present in the starting compound also may be converted to a carboxyl group. Suitable strong alkalies include sodium hydroxide and potassium hydroxide. Suitable oxidizing agents are silver oxide or alkali metal permanganates. Use of a strong alkali is essential for the intended purpose, because the combination of a weak acid or alkali with an oxidizing agent will yield a solvolysis product wherein the dihalomethyl group is converted to the formyl group while the esterified carboxyl group remains unchanged. The instant reaction is usually carried out in a solvent such as water or alcohols. The reaction temperature varies, without particular limitation, depending on the type of oxidizing agent.

In general, there is no particular limitation to the reaction temperature to be employed in the above-described solvolysis but an elevated temperature is preferable to shorten the required reaction period. The solvolysis product which has a salt-forming free carboxyl group may be recovered in the form of a metal salt.

In another generic embodiment of the present invention, a compound of the general Formula VII where at least one of $R_1$ and $R_2$ is the trihalomethyl group is reacted with a lower aliphatic carboxylic acid under substantially anhydrous conditions, thereby converting the halomethyl group to the carboxyl group. Suitable lower aliphatic acids include those in which the alkyl portion contains up to three carbon atoms, e.g. acetic acid, propionic aid, etc. Sometimes heating is preferable to shorten the period required to complete the reaction.

In still another generic embodiment, a compound of the general Formula VII is reacted with an aliphatic alcohol (R'OH wherein R' is lower alkyl or aralkyl) in the presence or absence of an organic base, thereby converting the trihalomethyl group to the correspondingly esterified carboxyl group (—COOR'). Suitable alcohols include methanol, ethanol, propanol, n-butanol, tertiary butanol, cyclohexanol, benzyl alcohol, etc. These alcohols are used with or without a solvent such as benzene, ether or the like. If no particular solvent is used, the alcohol also serves as a solvent. It is preferable to carry out the reaction in the presence of an organic base such as triethylamine, pyridine, etc. There is no particular limitation to reaction temperatures. However, it is usually recommended to carry out the reaction at a temperature of about the boiling point of the solvent used.

Typical compounds of the general Formula VII which are suitable as starting materials according to the present invention are the following: mono- and di-esters of 3-(substituted phenyl) pyrrole-2,5-dicarboxylic acids and 3 - (substituted phenyl) - 4 - halo - pyrrole - 2,5 - dicarboxylic acids, wherein the ester portion is alkyl such as methyl, ethyl, propyl, butyl, etc., or aralkyl such as benzyl, phenethyl, etc., and 2-(or 5-) trihalomethyl-3-(substituted phenyl) - 4 - halo - pyrrole - 5-(or 2-) carboxylic acid esters and 2,5-di-trihalomethyl-3-(substituted phenyl)-4-halo-pyrroles. These compounds are new compounds some of which can be obtained according to the methods described in our copending application Ser. No. 489,432, filed Sept. 22, 1965.

METHOD OF PREPARATION INVOLVING RING-CLOSURE

Certain 3-phenylpyrrole-2-carboxylic acid compounds of this invention are produced by a method involving ring-closure. Such compounds have the Formula VIII:

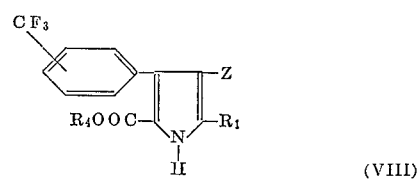

(VIII)

in which Z is hydrogen or halogen; $R_1$ is lower alkyl; and $R_4$ is hydrogen, lower alkyl or lower aralkyl.

The compounds (VIII) are useful as unstriated muscle relaxants.

The 3-phenylpyrrole-2-carboxylic acid compounds (VIII) may be prepared by reacting 1-phenylalkanone derivatives having the Formula IX:

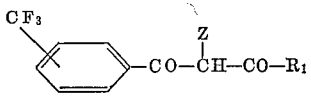

or its alkali metal salt, with a glycine derivative having the Formula X:

or its salt to make N-(3-phenyl-3-oxopropylidene) glycine derivatives having the Formula XI:

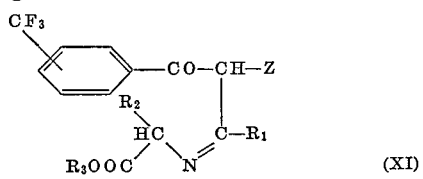

followed by ring-closure of the resultant compound (XI) in the presence of a condensing agent, and if needed, by hydrolyzing the reaction product.

In the above formula Z represents hydrogen or halogen, $R_1$ represents lower alkyl, $R_2$ represents hydrogen or esterified carboxyl, —$COOR_3$ represents esterified carboxyl wherein $R_3$ is lower alkyl or aralkyl. As used herein, the term "lower" is intended to indicate alkyl containing from one to six carbon atoms.

The mechanism of the reaction can be represented as follows:

In the above formulas, (IX)′, (IX)″ and (XI)′ represent the tautomers of (IX) and (XI), respectively.

1-phenylalkanone derivatives as starting materials may be prepared by using the method described in the Journal of Organic Chemistry 11, 414 and/or other methods known to the art.

1-phenylalkanone derivatives (IX) according to this invention mean 1-phenyl-1,3-butanedione, 1-phenyl-2-halo - 1,3 - butanedione, 1 - phenyl - 1,3 - pentanedione, 1 - phenyl - 2 - halo - 1,3 - pentanedione, 1-phenyl-1,3-hexanedione, 1-phenyl-2-halo-1,3-hexanedione, etc. in which phenyl is substituted by trifluoromethyl.

The glycine derivatives (X) include glycine esters such as the methyl ester, ethyl ester, propyl ester, butyl ester, tertiary butyl ester, benzyl ester or phenethyl ester, or aminomalonic acid diesters such as the dimethyl ester, diethyl ester, dipropylester, dibutylester, di-tedtiary butyl ester, dibenzylester, diphenethyl ester. Salts of the compounds (X) may also be used such as the salts with inorganic acids as hydrochloric acid, sulfuric acid, etc., or with organic acids.

The reaction of a 1-phenylalkanone derivative (IX) or its alkali metal salt, with a glycine derivative (X) or its salt is generally carried out in a solvent, and may be carried out with the addition of a base. The solvents used are, for instance, water, benzene, xylene, aliphatic lower alcohols, dichloromethane, chloroform, tetrachloromethane, 1,2-dichloroethane, glacial acetic acid, acetic acid, etc. A few examples of the bases used are alkali metal hydroxides such as sodium hydroxide or potassium hydroxide, alkali metal hydrogen carbonates such as sodium hydrogen carbonate or potassium hydrogen carbonate, alkali metal carbontes such as sodium carbonate or po-

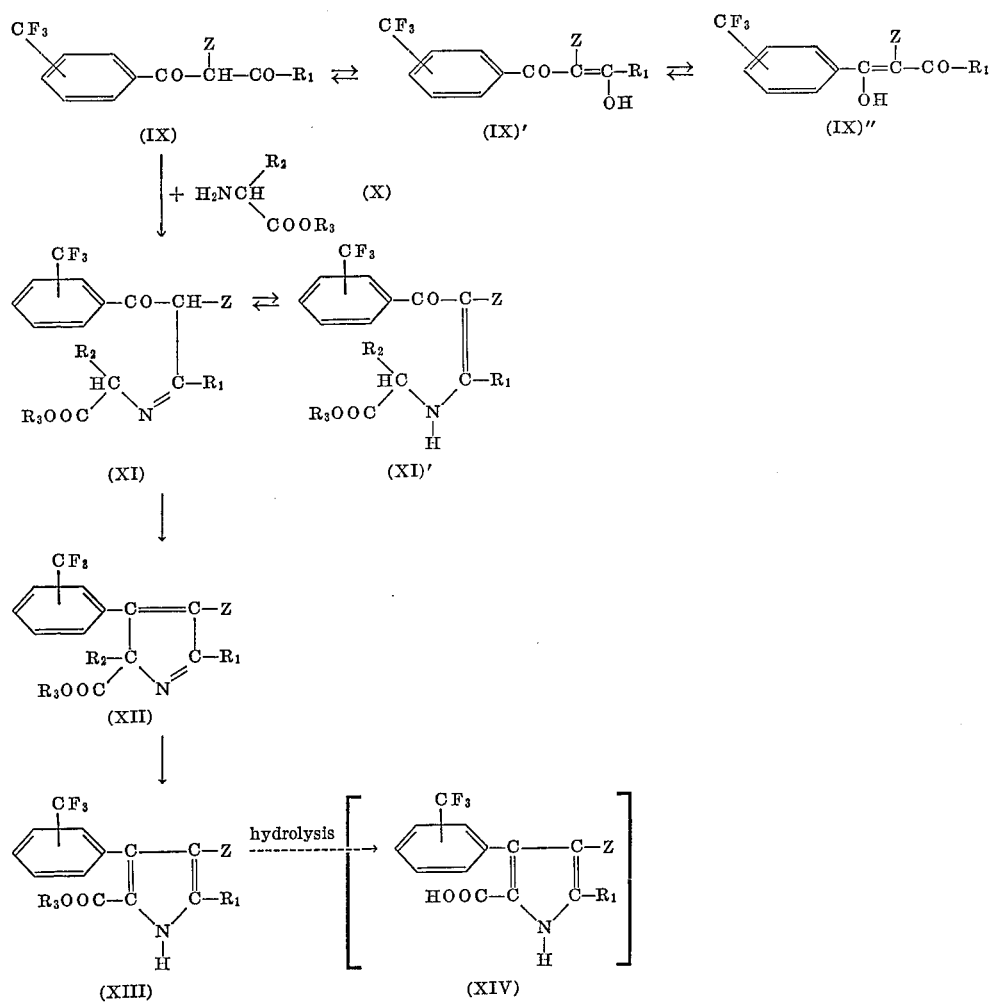

tassium carbonate and organic bases such as sodium acetate, piperidine, pyridine or trialkylamines. When using a salt of the glycine derivative (X) as starting material, it is preferable to carry out the reaction in the presence of a base. The reaction temperature is not particularly limited, being preferably at room temperature or at the boiling point of the solvent used.

By this reaction, the N-(3-trifluoromethyl substituted phenyl-3-oxopropylidene) glycine derivatives (XI) produced can generally be recovered in crystalline form, but, in some cases, the 3-trifluoromethyl substituted phenyl- of Umio et al. Ser. No. 489,412, filed Sept. 22, 1965, now U.S. Patent No. 3,367,944.

The antimicrobial activity of the compounds of this invention is given in the following table showing results obtained on testing said compounds against various kinds of pathogenic microorganisms.

There is shown in the table the minimum inhibitory concentration (M.I.C.) as measured for each compound according to the conventional agar dilution method. The results for pyrrolnitrin [ 3- (2 - nitro-3 - chlorophenyl)-4-chloropyrrole] are also shown as a basis of comparison.

| Compound | Minimum Inhibitory Concentration for Specified Microorganism | | | | |
|---|---|---|---|---|---|
| | Tricho. (2 days) | St. aur. | E. coli | Can. alb. | Myco (3 days). |
| Pyrrolnitrin [3-(2-nitro-3-chlorophenyl)-4-chloropyrrole] | 1 | 40 | >40 | 25 | 10 |
| 3.(3.trifluoromethylphenyl)-4-chloropyrrole | 1 | 10 | 10 | 10 | 20 |

Legend:
Tricho.: Trichophyton asteroides.
St. aur.: Staphylococcus aureus 209P.
E. coli: Escherichia coli.
Can. alb. Candida albicans.
Myco. Mycobacterium tuberculosis SP 607.

pyrrole-2-carboxylic acid derivatives (XIII) may be produced by way of the compounds (XII) which result from the ring-closure of the compounds (XI). For instance, a compound (XIII) can be obtained by reacting a compound (IX) with a compound (X) in the presence of a condensing agent such as sodium hydroxide or ethyl polyphosphate under anhydrous condition.

Ring-closure of the compound (XI) is generally carried out in the presence of a condensing agent and in an anhydrous solvent. Suitable condensing agents are, for instance, alkali metals (as potassium or sodium), alkali metal alcoholates, alkali metal hydrides, alkali metal amides, triphenylmethyl alkali metalate, boron trifluoride, zinc chloride, aluminum chloride, aluminum bromide, ferric chloride, stannic chloride, bismuth trichloride, titanium chloride, hydrogen chloride, hydrogen fluoride, a mixture of acetic anhydride and alkali metal carbonate or alkali metal acetate, pyrophosphoric acid, ethyl pyrophosphate, polyphosphoric acid, methyl polyphosphate, ethyl polyphosphate, propyl polyphosphate, isopropyl polyphosphate, piperidine, pyridine and triethylamine. The condensing agent when in liquid form may be used as a solvent. A few examples of suitable solvents are ethanol, ether, chloroform, benzene, toluene, xylene, dioxane, tetrahydrofuran, dimethylsulfoxide or dimethyl formamide. The reaction is usually carried out under cooling or heating to the boiling point of the solvent used.

The resulting 3-trifluoro methyl substituted phenylpyrrole-2-carboxylic acid derivatives (XIII), may be converted by hydrolysis to the corresponding free acids, if desired. A preferable hydrolyzing agent is an alkali metal hydroxide such as sodium hydroxide or potassium hydroxide, or an inorganic acid such as sulfuric acid.

The 3-trifluoromethyl substituted phenylpyrrole-2-carboxylic acid derivative (VIII) may also be prepared by the following procedure using 3-trifluoromethyl substituted phenyl-5-alkylpyrrole derivatives which are the decarboxylated compounds of 3-trifluoromethyl substituted phenyl-5-alkylpyrrole-4-carboxylic acid derivatives prepared as described in the copending U.S. patent application Ser. No. 468,970, now Patent No. 3,328,421. According to this procedure the 3-trifluoromethyl substituted phenyl-5-alkylpyrrole derivative is reacted with a carbonyl dihalide such as phosgene to obtain the 3-trifluoromethyl substituted phenyl-5-alkylpyrrole-2-carboxylic acid halide derivative which is then solvolyzed with water or alcohol.

The method of preparing compounds of this invention, which method involves the ring-closure heretofore described, is also disclosed in the copending application

DESCRIPTION OF THE PREFERRED EMBODIMENTS

A more comprehensive understanding of this invention is obtained by reference to the following examples.

Example 1

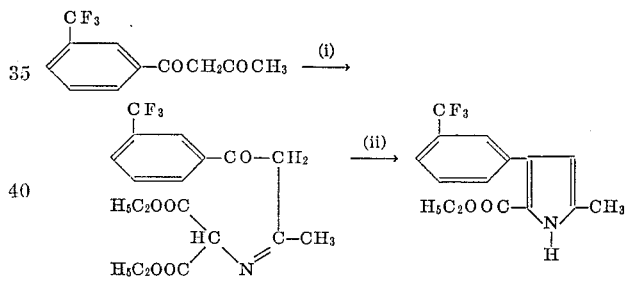

(i) A mixture of 1-(3-trifluoromethylphenyl)-1,3-butanedione (9.6 g.), diethyl aminomalonate (7.4 g.) and 10 cc. of absolute benzene was heated under reflux for 10 hours. (During the reaction, after the first 2 hours the greater part of the benzene was removed by distillation under reduced pressure and 50 cc. of absolute benzene was newly added, and after 2 more hours the same procedure was followed.) After completion of the reaction, the reaction mixture was washed with a saturated aqueous solution of sodium chloride and then with water, and dried over anhydrous magnesium sulfate. Then, the solvent was distilled off and unreacted reactants were distilled off under reduced pressure to yield 10.0 g. of diethyl N-[1-methyl-3-(3-trifluoromethylphenyl)-3-oxopropylidene]aminomalonate as a pale yellow viscous oil, which, after allowed to cool, solidified.

Infrared absorption spectrum: $\nu$CO—1745 and 1760 cm.$^{-1}$.

(ii) The above obtained N-[1-methyl-3-(3-trifluoromethylphenyl) - 3 - oxopropylidene]aminomalonate (18.0 g.) was added to isopropyl polyphosphate which was prepared by reacting 200 cc. of isopropanol with 100.0 g. of phosphorus pentoxide. The reaction mixture was heated at 90–95° C. for 20 hours.

After completion of the reaction, the reaction mixture was poured into 600 cc. of ice-water and the solution was subjected to extraction with ethyl acetate. The resulting extract was washed with water, 10% aqueous sodium hydroxide solution, water, 10% sulfuric acid and again with water in said order, and then dried over anhydrous magnesium sulfate. Thereafter, the ethyl acetate was distilled off. The residue was washed with a small quantity of petroleum benzin and then recrystallized from petroleum benzin to yield 7.0 g. of ethyl 3-(3-trifluoromethylphenyl)-5-methylpyrrole-2-carboxylate in the form of colorless plates of the M.P. 148–149° C.

Infrared absorption spectrum: $\nu$NH—3280 cm.$^{-1}$; $\nu$CO—1660 cm.$^{-1}$.

Analysis.—Calculated for $C_{15}H_{14}NO_2F_3$: C, 61.61; H, 4.75; N, 4.71. Found: C, 61.00; H, 4.74; N, 4.83.

Example 2

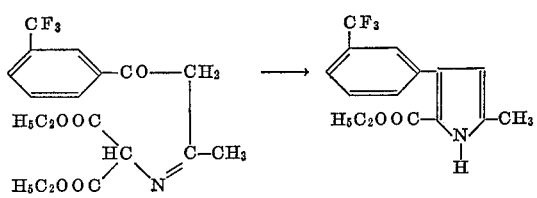

Diethyl N-[1-methyl-3-(3-trifluoromethylphenyl)-3-oxopropylidene]aminomalonate (1.1 g.) was added to a solution of sodium ethoxide prepared by reacting 50 cc. of absolute ethanol with 0.1 g. of metallic sodium and the mixture was heated under reflux for 19 hours. After completion of the reaction, the reaction mixture was poured into 300 cc. of ice water and the solution was subjected to extraction with ethyl acetate. The resulting extract was washed with water, 10% hydrochloric acid, and again with water in said order and dried over anhydrous magnesium sulfate. Thereafter, ethyl acetate was distilled off. The brown oily residue was subjected to chromatography on silica-gel using benzene as a solvent and the second fraction was collected.

This fraction was concentrated by distillation under reduced pressure to remove the benzene. The resulting residue was recrystallized from petroleum benzin to yield 0.2 g. of ethyl 3-(3-trifluoromethylphenyl)-5-methylpyrrole-2-carboxylate having the M.P. 145–147° C. The melting point of this product was not depressed by mixing it with the ethyl 3-(3-trifluoromethylphenyl)-5-methylpyrrole-2-carboxylate prepared according to Example 1(ii).

Example 3

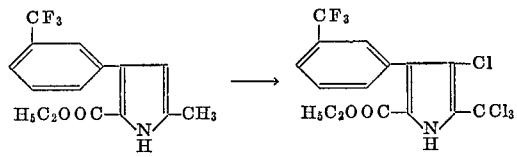

Ethyl 3-(3-trifluoromethylphenyl)-5-methylpyrrole-2-carboxylate (2.0 g.) was suspended in 20 cc. of acetic acid. A solution of 3.8 g. of sulfuryl chloride in 6 cc. of acetic acid was added dropwise to the suspension at 20–25° C. The mixture was stirred at 25–30° C. for 11 hours. Thereafter, the mixture was poured into ice-water and the solution was subjected to extraction with ethyl acetate. The extract was washed with an aqueous solution of potassium hydrogen carbonate and dried over anhydrous magnesium sulfate. Thereafter, the solvent was distilled off. Ethyl 3-(3-trifluoromethylphenyl)-4-chloro-5-trichloromethylpyrrole-2-carboxylate was obtained as a pale-brown viscous oil.

Example 4

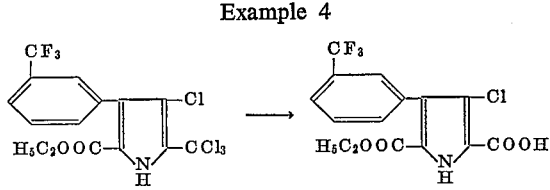

Ethyl 3-(3-trifluoromethylphenyl)-4-chloro-5-trichloromethylpyrrole-2-carboxylate (3.0 g.) was dissolved in 30 cc. of acetic acid and the solution was heated under reflux for 30 minutes. After completion of the reaction, the solvent was distilled off to yield 2.5 g. of 2-ethoxycarbonyl-3-(3-trifluoromethylphenyl)-4-chloropyrrole-5-carboxylic acid as a pale-red substance.

Infrared absorption spectrum: $\nu$NH—3270 cm.$^{-1}$; $\nu$COOH—2600 and 1710 cm.$^{-1}$; $\nu$COOC$_2$H$_5$—1670 cm.$^{-1}$.

Example 5

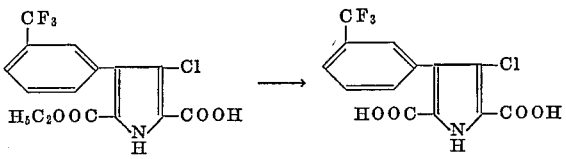

A mixture of 2-ethoxycarbonyl-3-(3-trifluoromethylphenyl)-4-chloropyrrole-5-carboxylic acid (2.5 g.), potassium hydroxide (2.1 g.), 6 cc. of water and 20 cc. of ethanol was heated under reflux for 3 hours. After completion of the reaction, the reaction mixture was concentrated by evaporation. The residue was diluted with water, acidified with 10% sulfuric acid under ice-cooling and then subjected to extraction with ethyl acetate. The extract was washed with water and dried over anhydrous magnesium sulfate. Thereafter, the solvent was distilled off under reduced pressure to yield 2.1 g. of 3-(3-trifluoromethylphenyl)-4-chloropyrrole-2,5-dicarboxylic acid.

Infrared absorption spectrum: $\nu$NH—3270 cm.$^{-1}$, $\nu$COOH—2600 and 1700 cm.$^{-1}$.

Example 6

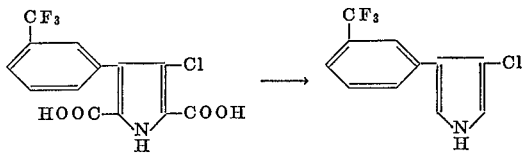

(i) 3-(3-trifluoromethylphenyl)-4-chloropyrrole-2,5-dicarboxylic acid (2.4 g.) was dissolved in 40 cc. of quinoline and the solution was heated at 250° C. for 25 minutes. The reaction mixture, after allowing it to cool, was poured into 200 cc. of 10% sulfuric acid and the solution was subjected to extraction with benzene. The benzene extract was washed with 5% aqueous sodium carbonate solution and then with water and dried. Thereafter, the resulting extract was subjected to chromatography using silica-gel and the second fraction was collected. This fraction was concentrated by distillation under reduced pressure to yield 1.1 g. of 3-(3-trifluoromethylphenyl)-4-chloropyrrole as a pale yellow oil, B.P. 118–120° C. (0.5 mm. Hg).

Analysis.—Calculated for $C_{11}N_7NClF_3$: C, 53.79; H, 2.87. Found: C, 54.32; H, 2.59.

What is claimed is:
1. A compound of the formula

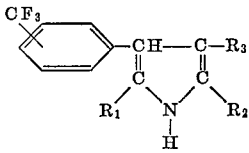

wherein:

$R_1$ is hydrogen, lower alkyl, trihalomethyl, or the group —COOR$_4$ in which R$_4$ is hydrogen, lower alkyl, or phenyl lower alkyl;

$R_2$ is hydrogen, lower alkyl, trihalomethyl, or the group —COOR$_5$ in which R$_5$ is hydrogen, lower alkyl, or phenyl lower alkyl; and $R_3$ is hydrogen, chlorine, or bromine.

2. Ethyl-3-(3-trifluoromethyl phenyl)-5-methyl pyrrole-2-carboxylate.

3. Ethyl-3-(3-trifluoromethyl phenyl)-4-chloro-5-trichloromethyl pyrrole-2-carboxylate.

4. 2-carbethoxy-3-(3-trifluoromethyl phenyl)-4-chloro pyrrole-5-carboxylic acid.

5. 3-(3-trifluoro methyl phenyl)-4-chloropyrrole-2,5-dicarboxylic acid.

6. 3-(3-trifluoro methyl phenyl)-4-chloropyrrole.

References Cited

Arima et al.: Agricultural and Biological Chemistry, vol. 28, No. 8, Aug. 19, 1964, pp. 575–78.

ALEX MAZEL, Primary Examiner

J. TOVAR, Assistant Examiner

U.S. Cl. X.R.

260—326.3; 424—274